CONTROL CIRCUIT WITH PHASE LEAD CHARACTERISTICS

Filed Feb. 7, 1962 2 Sheets-Sheet 1

*INVENTORS*
ANTHONY TEDESCHI
JOHN D. KEATING
BY Gravely, Lieder & Woodruff
ATTORNEYS INVENTORS
ANTHONY TEDESCHI
JOHN D. KEATING
BY Gravely, Lieder & Woodruff
ATTORNEYS 3,148,285
Patented Sept. 8, 1964

3,148,285

CONTROL CIRCUIT WITH PHASE LEAD CHARACTERISTICS

Anthony Tedeschi, El Paso, Tex., and John D. Keating, Florissant, Mo., assignors to McDonnell Aircraft Corporation, St. Louis, Mo., a corporation of Maryland Filed Feb. 7, 1962, Ser. No. 171,700
8 Claims. (Cl. 307—88.5)

The present invention relates generally to active control circuits and more particularly to a balanced active control circuit compatible with other active and passive circuits and which has leading phase characteristics. This invention has many of the same objectives and advantages as the invention covered by our co-pending application Serial No. 742,784, filed June 18, 1958, now Patent No. 3,026,423.

Because of the low impedance characteristics normally associated with active circuits generally and particularly with circuits having semi-conductive components such as transistors and the like, it has heretofore been difficult, if not wholly unsatisfactory, to connect such circuits in tandem arrangement. Furthermore, the known circuits have used components which are expensive, bulky, heavy and otherwise unsuitable in circuit mazes where the size, weight, and cost are important.

It is therefore an object of the present invention to overcome these undesirable characteristics of known control circuits and to provide an active circuit that is fully compatible with other active and passive circuits, and which has leading phase characteristics.

Another object is to provide a semi-conductive control circuit operative over a relatively broad range of frequencies independently of circuit output impedances.

Another object is to provide a control circuit employing active and passive components in which the phase and amplitude characteristics of a lead transfer function are obtained.

Another object is to provide a balanced semi-conductor control network consisting of active and passive components which produces a lead transfer function between the input and output, and in which the lead transfer function depends upon current characteristics which are relatively constant over the selected frequency range and are substantially independent of temperature changes.

Other objects and advantages of the present invention will become apparent after considering the following detailed specification in conjunction with the accompanying drawings.

Figure 1:
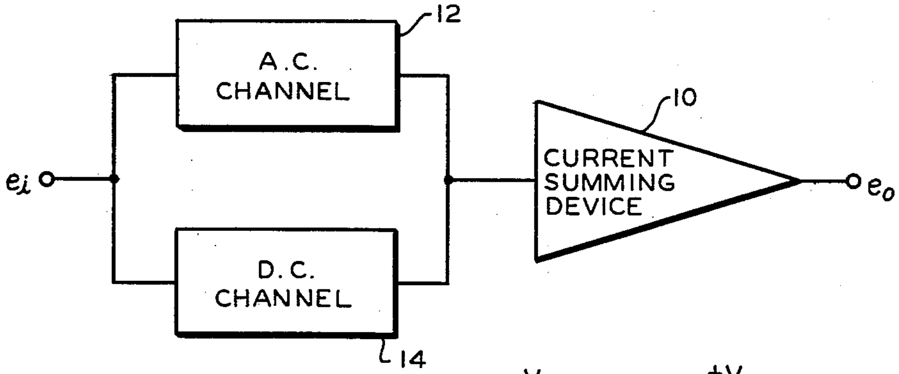
FIG. 1 is a block diagram illustrating the relationship of the more important components of the present circuit.

Referring now to the drawings by reference numerals, the block 10 (FIG. 1) refers to the active component of the present invention, and blocks 12 and 14 refer respectively to a passive alternating current input channel and a passive direct current input channel. Both of the input channels are connected to the input of the active component 10.

An input signal $e_i$ from an external source is fed to the input side of the alternating and direct current channels 12 and 14. The source of the input signal $e_i$ can be a signal generator, another active network, a vacuum tube circuit, or any other device capable of producing suitable input. The input signal producing device, however, preferably should have a relatively low input impedance. In the device as shown, the same input signal $e_i$ is fed both to the alternating and direct current channels 12 and 14 although it is contemplated that separate sources could be used provided they produce in-phase input signals. By using in-phase input signals, the output signal of the active component 10, designated $e_o$, will have an alternating current component preceded by a plus sign indicating that the output $e_o$ is ahead of or leads the input $e_i$. This will be explained more fully hereinafter.

Figure 2:
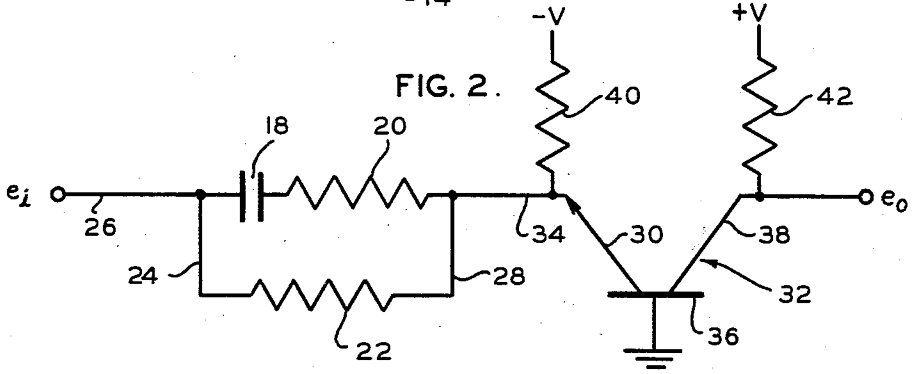
FIG. 2 is a schematic wiring diagram illustrating a particular embodiment of the circuit of FIG. 1.

The alternating current channel 12 is shown in FIG. 2 consisting of a series combination of a capacitor 18 and a resistor 20. The direct current channel 14 is shown consisting of a resistor 22. The input sides of the alternating current and direct current channels 12 and 14 are connected together by a lead 24, and by another lead 26 to the input signal producing device (not shown). The output side of the channels 12 and 14 are connected together by lead 28, and the lead 28 is connected to the emitter element 30 of a transistor 32 by a lead 34. The transistor 32 is the active element in the circuit and is current, not voltage, controlled.

The transistor 32 has a grounded base element 36, a collector element 38, and the previously mentioned emitter element 30. The output signal $e_o$ appears on the collector element 38. A biasing resistor 40 is connected to the emitter element 30, and biases the transistor 32 into an operative condition. In the usual situation, the bias resistor 40 has a much greater impedance than the input impedance of the transistor 32.

A load element, shown in FIG. 2 as the resistor 42, is connected to the collector element 38 for the usual purposes.

It is contemplated that either a NPN or a PNP junction transistor can be used for the active element. Since the characteristics and construction of such devices are well known, it is not deemed necessary to include a full description thereof in this specification. It is sufficient for present purposes to note that semi-conductor elements such as a transistor 32 are current controlled. It should also be noted that polarity changes must be made if a PNP junction transistor is used instead of a NPN transistor in order to produce an operative condition.

It has already been pointed out that a current amplifying device, such as a grounded base junction transistor has inherently low input impedance. Therefore, to write an equation which will present the relationship of the input and output signals, both as to phase and magnitude, it is necessary to take into account the current amplifying characteristics of the semi-conductor or active component. A generalized equation representing the output signal $e_o$ in terms of the input signal $e_i$, taking into account the transfer function of the device, can be written as follows:

(1) $e_o = e_i$ times the transfer function

This can be rewritten more specifically:

$$\frac{e_o}{e_i} = 1 + \frac{(T_1 - T_2)}{T_2} \cdot \frac{(T_2 s)}{1 + T_2 s} = \frac{1 + T_1 s}{1 + T_2 s} \tag{2}$$

In Equation 2, $T_1$ represents the time constant for the direct current channel 14, $T_2$ represents the time constant for the alternating current channel 12, and $s$ represents the well known Laplacian operator $(d/dt)$.

In order for the transfer function to be a leading function instead of a lagging function it is to be considered in Equation 2 that the independent term in the numerator is identically zero. Equation 2 then becomes:

$$\frac{e_o}{e_i} = \frac{T_1 s}{1 + T_2 s} \tag{3}$$

Applying Equations 2 and 3 to the circuit shown in

FIG. 2 and making the assumptions that a small signal condition; namely that $r_c$, which is the equivalent circuit collector resistance, is very much larger than $r_b$, the equivalent circuit base resistance, and that $R_e+r_e$ which is the added emitter resistance plus the equivalent emitter resistance is very much larger than $r_b$.

The following equation can be written:

$$\frac{e_o}{e_i}=\frac{\alpha r_c}{r_c+R_L}\cdot\frac{R_L}{R_1}\left[1+\frac{R_1}{R_2}\cdot\frac{R_2C_2s}{1+R_2C_2s}\right] \tag{4}$$

In Equation 4, alpha ($\alpha$) is the small signal short circuit current gain under grounded base conditions, $R_L$ is the load resistor 42, $R_1$ (is the same as $R_e$) and is the direct current input channel 14 resistor 22, and $R_2$ and $C_2$ are the alternating current input channel 12 resistor 20 and capacitor 18 respectively. As noted above, the biasing resistor 40 ($R_B$) is very much larger than the input impedance of the transistor.

The plug sign in the numerator of the bracketed expression in Equation 4 indicates a lead transfer function, and separates the direct current and alternating current components. As expected, the alternating current component varies in magnitude as a function of time as indicated by the Laplacian operators.

If the coefficient of the bracketed expression in Equation 4 is made equal to a constant term, the following can be written:

$$K=\frac{\alpha r_c\ (R_L)}{r_c+R_L(R_1)} \tag{5}$$

Solving for $R_L$ in Equation 5

$$R_L=\frac{KR_1r_c}{\alpha r_c-KR_1} \tag{6}$$

The constant term K can be arbitrarily chosen to meet a particular load condition. For example, $KR_1$ can be made to approach the value of $r_c$, in which case the load $R_L$ approaches infinity. On the other hand, if $KR_1$ is very small with respect to $r_c$, then $R_L$ depends on the value of the expression $KR_1$ which is a fairly constant term over a selected frequency range and is relatively independent of temperature changes. Therefore, by proper selection of elements, the present device can be designed to operate with almost any load.

If the collector resistor $r_c$ is much greater than the load resistance $R_L$, the constant multiplier may be arbitrarily chosen by fixing the value of the load resistance $R_L$. For example, if the load resistance is chosen equal to $R_1$, then K equals unity. In this situation $R_B$, the biasing resistor 40, is adjusted to produce the necessary bias current for the desired quiescent collector to base voltage. A positive or negative base potential at the input may be readily balanced out by $R_B$. If a PNP junction transistor is used instead of a NPN junction transistor a polarity change will be necessary as indicated above.

Heretofore, it has been difficult to construct a transistor circuit which is compatible with other transistor circuits, vacuum tube circuits, and like devices because of the low impedance characteristics of transistors. With the present device, however, as illustrated in the accompanying circuit diagrams, an active lead network is provided that can be adjusted to be compatible with any other circuit. This is true because the load resistor $R_L$ can assume any value depending only on the proper selection of the various circuit parameters. In this respect the present invention has its most important advantage.

In addition to being compatible with other circuits because of the broad selection of loads made available, the present device also affords a saving both in space and weight of the elements employed. Furthermore, the biasing resistor 40 can be adjusted in advance to balance out, and not necessarily eliminate, the direct current flowing in the input channels thereby enabling polarized capacitors to be employed which are smaller in size and weight than regular capacitors. This is particularly important where circuits such as the present circuit are used as part of larger networks and the whole network must fit into relatively small space and be light weight.

Figure 3:
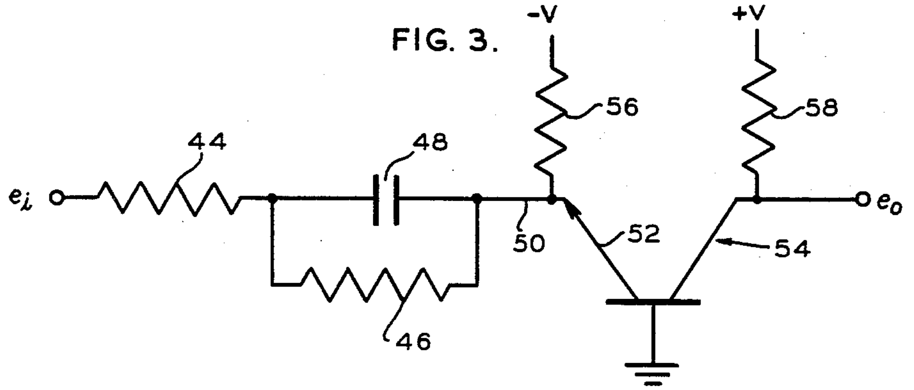
FIG. 3 is a schematic wiring diagram illustrating another embodiment of the circuit of FIG. 1.

In FIG. 3 a modified form of the circuit of FIG. 2 is shown. In FIG. 3, a resistor 44 has one end connected to the input signal source and the opposite end connected to a parallel circuit consisting of a resistor 46 and a capacitor 48. The opposite side of this parallel circuit is connected by lead 50 to the emitter element 52 of transistor 54.

In the modified circuit the direct current channel, corresponding to block 14 of FIG. 1 includes the resistors 44 and 46 in series, and the alternating current channel includes the capacitor 48 and the resistor 44 in series corresponding to block 12 in FIG. 1. A biasing resistor 56 and a load resistor 58 are also provided.

In the modified circuit of FIG. 3, the output impedance of the input signal source, designated $e_1$, is much smaller than the series parallel impedance of the elements 44, 46 and 48 over the band width involved.

Making the same assumptions that were made in arriving at Equation 4, the transfer function of the circuit shown in FIG. 3 may be written as follows:

$$\frac{e_4}{e_3}=\frac{\alpha R_L}{R_1+R_2}\cdot\frac{r_c}{r_c+R_L}\left[1+\frac{\frac{R_2}{R_1}\cdot\frac{R_1}{R_1+R_2}\cdot C_2R_2s}{1+\frac{R_1}{R_1+R_2}\cdot C_2R_2s}\right] \tag{7}$$

Equation 7 provides an expression for the output with respect to the input in terms of the circuit constant, and is based on Equations 1 and 2 above. Again, the coefficient in Equation 7 can be equalized to a constant K as follows:

$$K=\frac{\alpha R_L}{R_1+R_2}\cdot\frac{r_c}{r_c+R_L} \tag{8}$$

As in the previous example, if the collector input resistance $r_c$ is much greater than the load resistance $R_L$, the constant multiplier K may be arbitrarily chosen by fixing the value of the load resistance $R_L$. For example, if the load resistance $R_L$ is chosen equal to $$\frac{R_1+R_2}{\alpha}$$

then K equals 1 or unity.

In view of this situation, the same advantages are available for the modified circuit of FIG. 3 as are present for the circuit shown in FIG. 2.

Figure 4:
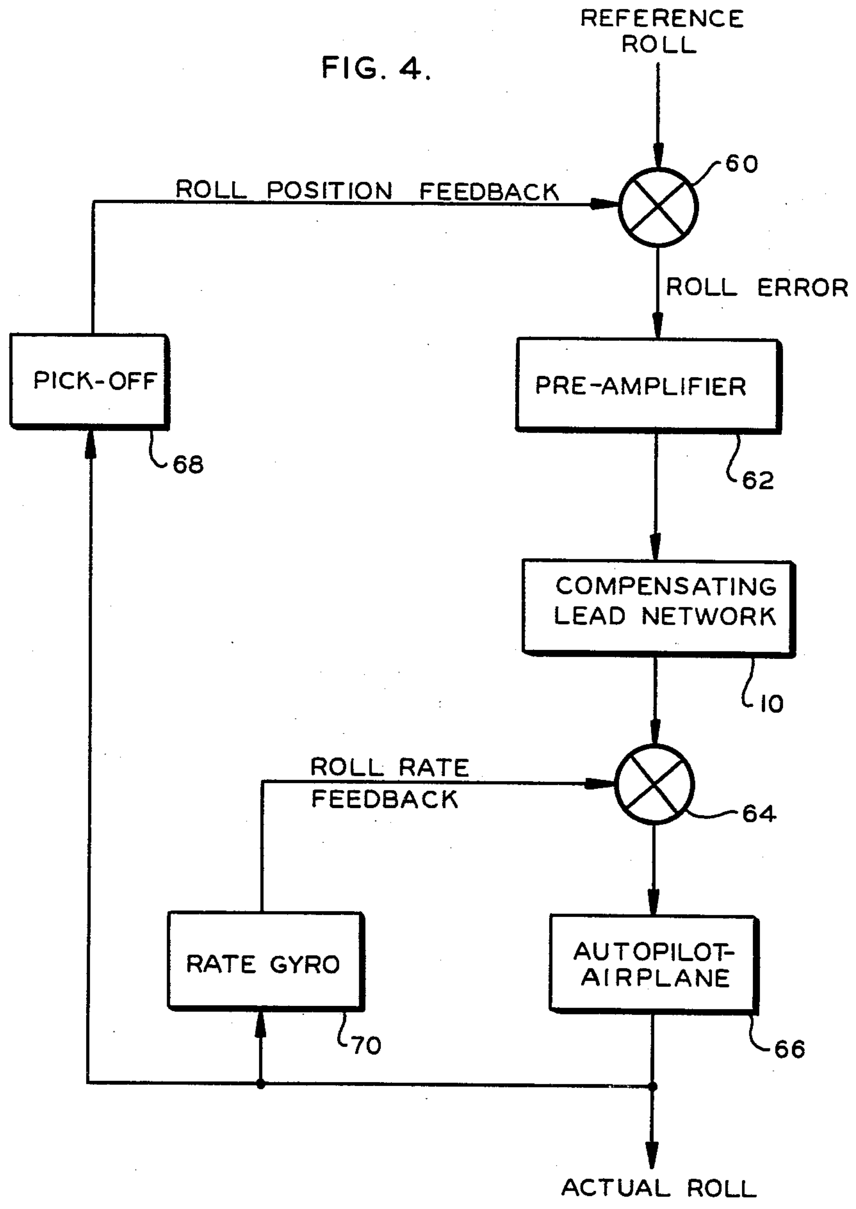
FIG. 4 is a block diagram of an auto-pilot control system illustrating a typical environment for the present device.

In FIG. 4 a circuit is shown which illustrates schematically one of many possible applications for the present circuit. The system shown in FIG. 4 is used for controlling the roll of an airplane or other air or space borne vehicle and could be incorporated as part of a known automatic piloting device. The member 60 in FIG. 4 indicates the amplitude or amount of roll of the vehicle with respect to some known reference. The output of the member 60 is fed to a preamplifier circuit 62, and from there to the present active control circuit 10.

The output of the device 10 is fed to a deviation indicating device 64 which indicates how rapidly the indicated roll should be corrected. The output of the device 64 is then fed into an auto-pilot device 66. The output of the auto-pilot device in turn is fed to the missile or airplane controls which actually do the correcting. The output signal from the autopilot 66 contains two components, one of which varies in amplitude with the amount of roll deviation and is fed back through a pick off circuit 68 to the member 60 and may be thought of as analogous to the feed back circuit used for control purposes. The other component of the output from the autopilot 66 is fed to a rate gyro circuit 70 and from there back to the device 64. This component of the output is frequency responsive and determines the rate at which the roll deviation is to be corrected.

Many other devices and applications using the subject circuit could also be shown and described, and all such devices and applications wherein the subject device could be used are within the scope of this disclosure.

Thus it is apparent that there has been shown and described novel circuit means employing active and passive elements connected to produce a lead transfer function between an input signal and an output signal. The subject circuit may also produce a gain or amplification. Furthermore, the subject circuit employs relatively small compact elements which reduce its size and weight, and the circuit can be made to operate over a selected range of frequency with relatively little effect produced thereon by temperature and other natural changes. At the same time the subject circuit takes advantage of low input impedance characteristics and current amplifying characteristics to produce a current summing and current amplifying device which operates independently of the value of the equivalent input collector impedance and of the functional dependents of said impedance on temperature. These and other objects and advantages are obtained by the present device which fulfills all of the objects and advantages sought therefor. Furthermore, the present invention teaches the use of a control circuit which can be made to operate compatibly with most other known types of circuits and circuit elements.

It is anticipated, however, that many changes, alterations, and modifications of the subject device will become apparent to those skilled in the art after reading this specification in conjunction with the accompanying drawings. All such changes, alterations and modifications which do not depart from the spirit and scope of the invention are deemed to be covered by the present invention which is limited only by the claims which follow.

What is claimed is:

1. A current operated control circuit including active and passive elements capable of producing an output signal which leads an input signal in phase comprising a semi-conductive element having an input electrode, means biasing said input electrode to a predetermined operating condition, a collector electrode connected to a load, means biasing said collector electrode to an operating condition, an input circuit having parallel connected alternating current and direct current channels one side of which is connected to the input electrode and the opposite side of which is connected to an input signal source, said semi-conductive element responding to the input signal to produce an output signal at the collector electrode which is phase displaced ahead of the input signal and which varies in amplitude therewith, the ratio of the output signal voltage to the input signal voltage being expressed by the equation $$\frac{e_o}{e_i}=\frac{\alpha r_c}{r_c+R_L}\cdot\frac{R_L}{R_1}\left[1+\frac{R_1}{R_2}\cdot\frac{R_2C_2s}{1+R_2C_2s}\right]$$

wherein alpha ($\alpha$) is the small signal short circuit gain of the circuit, $r_c$ is the equivalent circuit collector resistance, $R_L$ is the circuit load, $R_1$ is the resistance of the alternating current input channel, $C_2$ is the capacitance of the alternating current input channel, $s$ is the Laplacian operator, and the plus sign in the expression denotes a lead transfer function.

2. A control circuit capable of producing a lead transfer function between an input signal and an output signal comprising a current operated element having an input electrode, a collector electrode and a grounded base, an input circuit connected to the input electrode, said input circuit including a direct current channel and an alternating current channel, means exciting said input circuit with an input signal, means biasing said input and collector electrodes of the current operated element to operating conditions, said current operated element responding to the input signal to produce an output signal at the collector electrode that is phase displaced ahead of the input signal, the impedance of said control circuit as seen at the collector electrode being independent of the characteristics of the current operated element and represented mathematically by the expression $$R_L=\frac{KR_1r_c}{\alpha r_c-KR_1}$$

wherein $R_L$ is the impedance seen at the collector electrode, K is a constant, $R_1$ is the impedance of the direct current input channel, $r_c$ is the equivalent collector resistance, and alpha ($\alpha$) is the small signal short circuit current gain under grounded base conditions.

3. A current operated circuit capable of producing an output signal which leads an input signal applied thereto comprising a current operated element having an input electrode connected to an input signal source, a collector electrode connected to a load, and a grounded base, an input circuit connected between the input signal source and the input electrode including parallel alternating current and direct current channels each of which includes passive elements therein, said current operated element producing an output signal which has amplitude characteristics which correspond to the amplitude characteristics of the input signal but which leads said input signal in phase, the impedance of said circuit as seen looking back from the load depending substantially entirely upon the parameters of the passive circuit elements and being expressed by the equation $$R_L=\frac{KR_1r_c}{\alpha r_c-KR_1}$$

wherein $R_L$ is the impedance as seen looking back from the collector electrode, K is an arbitrarily chosen constant, $R_1$ is the impedance of the direct current input channel, $r_c$ is the equivalent collector resistance, and alpha ($\alpha$) is the small signal short circuit current gain under grounded base conditions.

4. A current operated circuit including active and passive members capable of compatible operation with other current and voltage operated circuits regardless of the frequency and impedance characteristics thereof by proper selection of the parameters for the passive members only, said circuit being capable of producing an output signal which leads an input signal in phase comprising a semi-conductive member having a grounded base, an emitter electrode, and a collector electrode, a balanced passive input network connected between one of said electrodes and an input signal source, said network having an alternating current branch including resistive and capacitive members and a direct current branch including a resistive member, and a load circuit connected to the other of said electrodes of said semi-conductive member, said semi-conductive member responding to the input signals to produce output signals that are phase displaced ahead of the input signals, said circuit having input and output impedance characteristics which are independent of the characteristics of the semi-conductive member, the circuit impedance as seen at the other of said electrodes being matched to the impedance of a load in accordance with the equation $$R_L=\frac{KR_1r_c}{\alpha r_c-KR_1}$$

wherein $R_L$ is the matched load impedance as seen at at the said other electrode, K is a constant, $R_1$ is the impedance of the direct current input channel impedance, $r_c$ is the equivalent collector resistance, and alpha ($\alpha$) is the small signal short circuit current gain under grounded base conditions.

5. In a current operated control circuit which is compatible with other active and passive circuits, the improvement comprising providing a transistor having emitter and collector electrodes and having an input network connected to one of said electrodes including parallel connected alternating current and direct current input channels, an input signal source connected to said channels, and an output circuit connected to the other of said electrodes, said circuit being constructed and biased to produce an output signal which leads the input signal, the ratio of the output signal to the input signal being represented by the expression $$\frac{e_o}{e_i}=\frac{T_1 s}{1+T_2 s}$$

wherein $T_1$ is the time constant of the direct current input channel, $T_2$ is the time constant of the alternating current input channel, $s$ is Laplacian operator $(d/dt)$, and the plus sign indicates a lead transfer function between the input and output signals.

6. In a current operated control device which can be made compatible with other current or voltage operated circuits, a junction transistor having an emitter element, a collector element, and a grounded base element, an input signal circuit having parallel connected alternating and direct current branches connected to one of said transistor elements, an input signal source connected to said branches, another one of said transistor element being connected to an output circuit, said transistor responding to input signals to produce an output signal at said output circuit which leads said input signal in phase, the ratio of the output signal to the input signal being represented by the expression $$\frac{e_o}{e_i}=\frac{T_1 s}{1+T_2 s}$$

wherein $T_1$ is the time constant of the direct current input branch, $T_2$ is the time constant of the alternating current input branch, $s$ is the Laplacian operator $(d/dt)$, and the plus sign indicates a lead transfer function.

7. A current operated device comprising active and passive elements, said active element including a transistor having a grounded base, an emitter electrode, and a collector electrode, input circuit means connected to one of said electrodes including signal generating means capable of generating an input signal, a pair of input channels connected between the generating means and said one electrode including passive circuit components, means biasing the emitter and collector electrodes to selected voltages, an output circuit connected to the other of said electrodes including a passive load component, the impedance of said load component being matched to the impedance of said current operated device by proper selection of the parameters of the passive circuit components only and being expressed by the equation $$R_L=\frac{KR_1 r_c}{\alpha r_c-KR_1}$$

wherein $R_L$ is the impedance of the load component, K is a constant arbitrarily chosen to meet a particular load condition, $R_1$ is the direct current input channel impedance, $r_c$ is the equivalent collector impedance, and alpha ($\alpha$) is the small signal short circuit gain under grounded base conditions.

8. A current operated circuit capable of producing a lead transfer function between an input signal and an output signal comprising a transistor having an input element, an output element and a grounded base element, an input circuit connected to the input element including parallel connected direct current and alternating current channels, an input signal source connected to the direct and alternating current channels and capable of generating an input signal of predetermined amplitude and phase characteristics, means biasing the input and output elements of the transistor to an operating condition whereby the transistor responds to the input signal to produce an output signal which leads said input signal, and a load circuit connected to the output element and excited by the leading output signal, the impedance of said load circuit being matched to the impedance of the current operated circuit independently of the characteristics of the transistor, the load impedance being expressed by the equation $$R_L=\frac{KR_1 r_c}{\alpha r_c-KR_1}$$

wherein $R_L$ is the load impedance, K is a constant arbitrarily selected to meet a particular load condition, $R_1$ is the direct current input channel impedance, $r_c$ is the equivalent collector impedance, and alpha ($\alpha$) is the small signal short circuit gain under grounded base conditions.

References Cited in the file of this patent

UNITED STATES PATENTS

| | | |
|---|---|---|
| 2,590,528 | Gilbert | Mar. 25, 1952 |
| 2,885,495 | Sziklai et al. | May 5, 1959 |
| 2,917,694 | Ashcraft | Dec. 15, 1959 |
| 3,005,139 | Chin et al. | Oct. 17, 1961 |
| 3,047,808 | Gray | July 31, 1962 |

OTHER REFERENCES

Pub. "Techniques And Developments in the Analog Computer Field," published by McDonnell Aircraft Corp., dated November 1956 (Report 4966—Serial No. 154).